United States Patent
Bombardier et al.

[15] 3,637,267
[45] Jan. 25, 1972

[54] CLEAT ELEMENT FOR TRACKED VEHICLES

[72] Inventors: Jacques Bombardier; Rejean Leclerc, both of Valcourt, Quebec, Canada

[73] Assignee: Bombardier Limited, Valcourt, Quebec, Canada

[22] Filed: June 8, 1970

[21] Appl. No.: 44,443

[52] U.S. Cl. ................................................... 305/35 EB
[51] Int. Cl. .......................................................... B62d 55/26
[58] Field of Search .......................................... 305/35 EB, 54

[56] References Cited

UNITED STATES PATENTS

| | | | |
|---|---|---|---|
| 2,064,890 | 12/1936 | Dorst | 305/35 EB |
| 1,521,454 | 12/1924 | Linn | 305/54 |
| 2,992,862 | 7/1961 | Fredricks | 305/35 EB X |
| 3,368,292 | 2/1968 | Pinroth | 305/35 EB X |
| 3,148,920 | 9/1964 | Nodwell | 305/35 EB |

*Primary Examiner*—Richard J. Johnson
*Attorney*—Larson, Taylor and Hinds

[57] ABSTRACT

A cleat element for fixing to the outer surface of an endless flexible track, and particularly to that type of track found on snow-compacting vehicles, is provided having a triangular shape and constructed of an angle iron filled with rubber contained within its sidewalls. An an antiskidding device, the vehicle is provided with a plurality of rubber pads integrally mounted on the rubber face and disposed at spaced-apart locations along the length of the surface.

15 Claims, 9 Drawing Figures

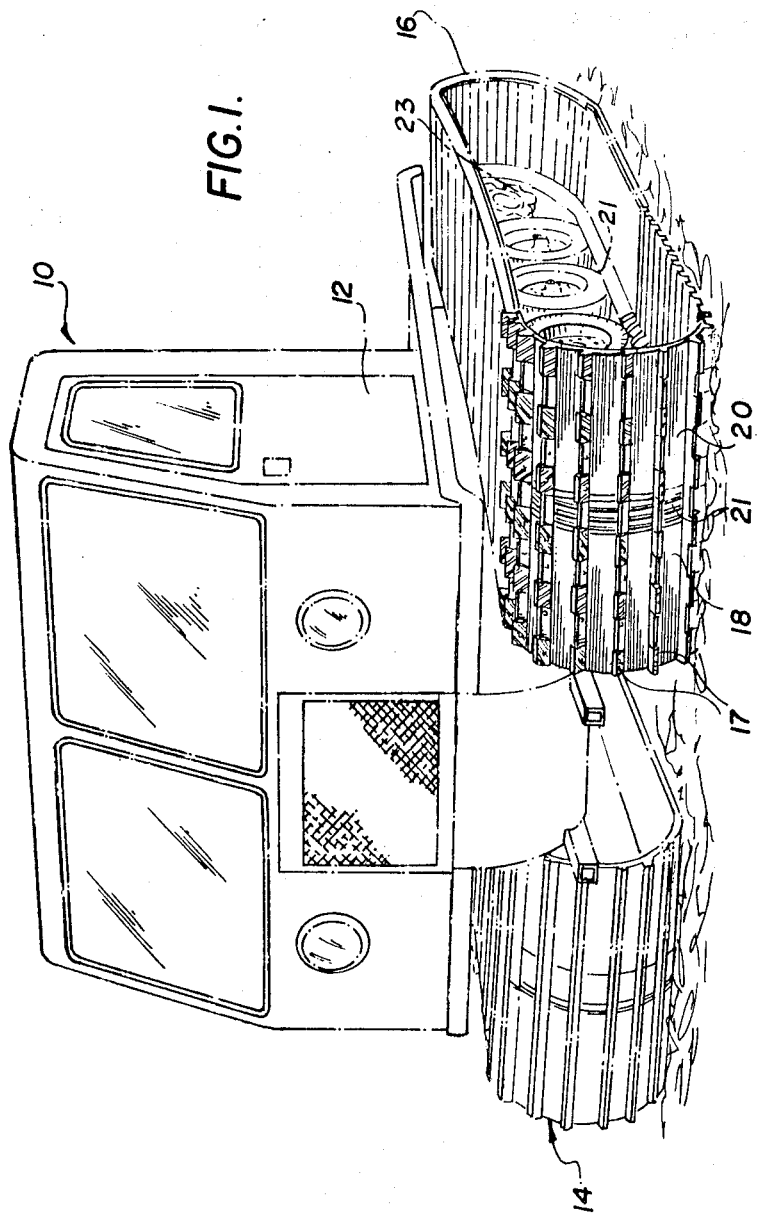

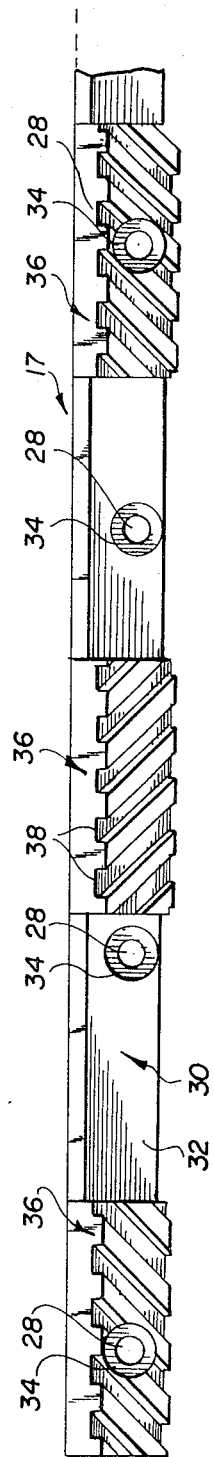
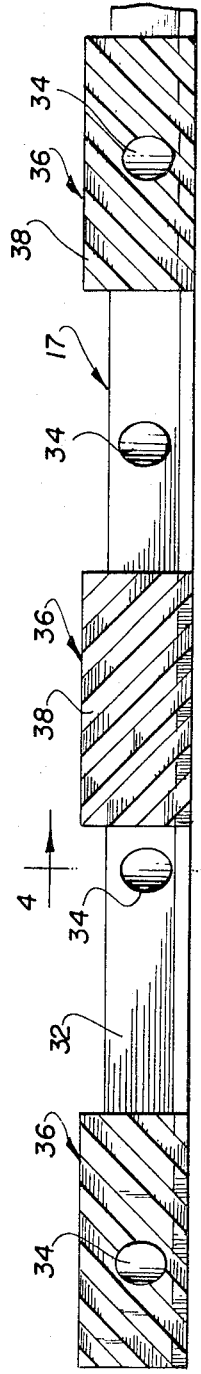
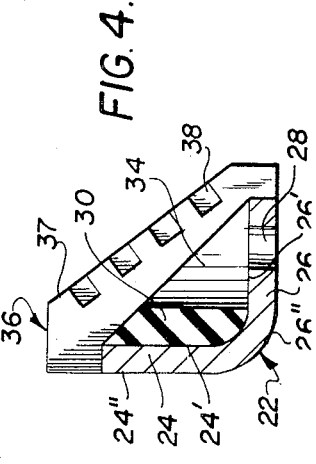

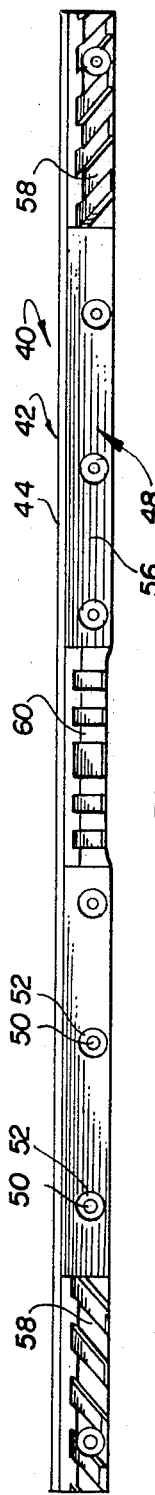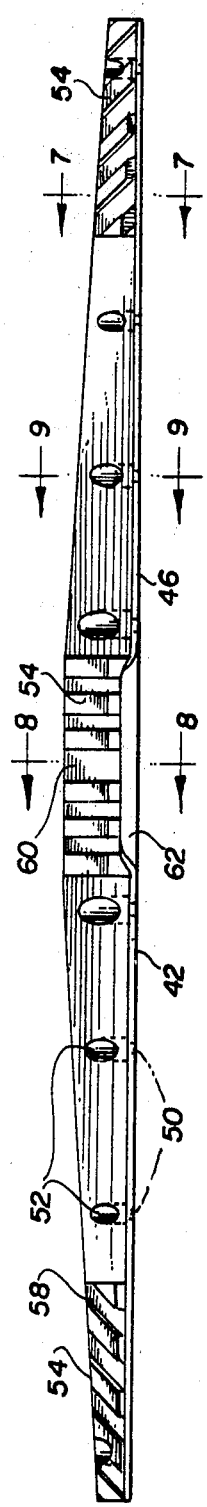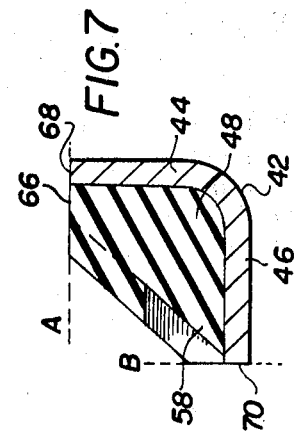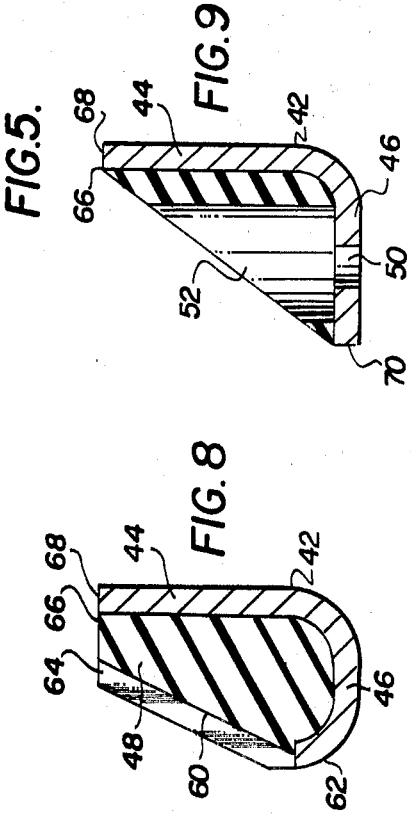

CLEAT ELEMENT FOR TRACKED VEHICLES

BACKGROUND OF THE INVENTION

Such vehicles usually consist of a small chassis mounted over one or more relatively large endless tracks which propel the vehicle; but which also serve to compact fresh fallen light powder snow over which it runs. The outer surfaces of these tracks are equipped with steel grousers, extending transversely and spaced longitudinally of the tracks to provide proper traction to the vehicle and to break up and pulverize hard or iced snow which is usually found on ski hills at the end of the day or after a certain number of days without snow. On certain vehicles, such as multitrack vehicles where a large ground engaging track surface is provided, these cleats serve the additional purpose of cross-linking spaced-apart rubber belts in a parallel relationship. One disadvantage of the cleats found on most known vehicles is that, because of their particular shape, when digging in the snow, they leave a series of ridges on the snow thus rendering skiing quite hazardous. Some cleats, for instance, are U-shaped channels and wet snow is easily collected between the two opposite arms, again leaving trailing ridges on the packed snow.

A further disadvantage of presently known cleats is that although they provide proper traction to the vehicle they are inefficient as antiskidding devices when the vehicle is travelling slanted on ski slopes. The vehicle, while skidding, will run over already compacted snow or miss areas of unpacked snow.

It is an object to this invention to provide an improved cleat element whereby the snow conditioning of snow-covered surfaces is improved and whereby the traction of the vehicle is increased.

It is a further object of this invention to provide a cleat element whereby the vehicle tendency to skid on ski slopes is reduced.

SUMMARY OF THE INVENTION

In order to overcome the above disadvantages, the present invention provides a cleat element of the preferred triangular shape having an oblique angle surface and constructed of an angle iron filled with rubber. As an antiskid device, the cleat is provided with a plurality of projections integrally mounted on the angle surface and disposed at spaced-apart locations along the length of the surface.

The present invention therefore provides a cleat element for fixing to an endless track of the type used on track propelled vehicles, which comprises an elongated rigid angular member formed of a sidewall and a bottom wall, the walls defining contiguous inner and outer surfaces; and a rubberlike resilient material contained within the contiguous inner surfaces of the side and bottom walls through the entire length thereof, the material being bonded to the inner surfaces and defining a side surface angled relative to the sidewalls to thereby form a cleat of triangular cross section.

In a preferred embodiment of the invention, the sidewall of the cleat element has been given a particular configuration to correspond to the distribution of forces on said sidewall.

BRIEF DESCRIPTION OF THE DRAWINGS

In the drawings which illustrate embodiments of the invention,

FIG. 1 is a front perspective view of a snow-compacting vehicle utilizing a series of cleat elements in accordance with the present invention;

FIG. 2 is a front view of substantially a half-section of one cleat element shown mounted on the rubber endless tracks of the vehicle of FIG. 1;

FIG. 3 is a top view of the half-section of the cleat element shown in FIG. 2;

FIG. 4 is a sectional view, partly broken away, taken along lines 4—4 of FIG. 2;

FIG. 5 is a front view of a preferred embodiment of a cleat element in accordance with the present invention;

FIG. 6 is a top plan view of the cleat element shown in FIG. 5;

FIG. 7 is a cross-sectional view taken along lines 7—7 of FIG. 5;

FIG. 8 is a cross-sectional view taken along lines 8—8 of FIG. 5; and

FIG. 9 is a cross-sectional view taken along lines 9—9 of FIG. 5.

DESCRIPTION OF A PREFERRED EMBODIMENT

Referring to FIG. 1, there is shown a vehicle 10 adaptable for travelling principally over snow; the chassis 12 of the vehicle is mounted over a pair of endless flexible members 14 and 16, each having sufficient width to cover a large area of snow over which it runs. Vehicles of this type are used principally for compacting snow on ski hills or any other areas where snow conditioning is desired; such vehicles may be provided with tracks of varied construction. In the vehicle shown in FIG. 1, a mat or roller may be hooked up to the rear of the vehicle so that the snow between members 14 and 16 is not left unpacked. The present invention, however, is not restricted to a particular vehicle nor to a particular arrangement of tracks but pertains to a cleat element to be fixed to the one or more of these endless flexible tracks that propel these vehicles. As shown in FIG. 1, a series of longitudinally spaced-apart cleat elements 17 are mounted transversely of the tracks. They provide the traction to the vehicle. Additionally they serve to cross-link the two flexible endless rubber tracks 18 and 20 of member 16 in a symmetrical arrangement with respect to the track engaging tired wheels 21 and to powered sprocket wheels 23 driving the tracks 18 and 20; similar cleat elements (not shown) are mounted on the other member 14 to cross-link a similar pair of rubber tracks of corresponding dimensions in parallel relationship.

Referring to FIGS. 2, 3 and 4, the cleat structure 17 is formed of an elongated rigid member 22, such as an angle iron, formed of a sidewall 24 and a bottom wall 26 extending lengthwise thereof. Both walls are at an angle to each other, preferably 90°, and define contiguous inner surfaces 24' and 26' and contiguous outer surfaces 24'' and 26''. A series of spaced-apart holes 28 are provided for bolting or likewise securing the bottom wall transversely to the outer surface of the rubber tracks. A rubberlike resilient material 30 is contained between the inner surfaces 24' and 26', through the entire length of the cleat structure, and fixed thereto by the standard method of rubber bonding on metal; the material defines an oblique side surface 32 contiguous with outer surfaces 24'' and 26'' and making an acute angle with the plane of each of these outer surfaces. A cleat element of triangular shape is thus formed; this shape is the most preferred since it offers the smallest area of penetration in the snow. The angle of side surface 32 and the endless belt may vary considerably depending on the size and weight of the vehicle and its intended duty, and satisfactory results have been obtained with two exemplary embodiments respectively at 45° and 60°. A series of holes 34, coaxial with holes 28, are provided at intervals along the oblique side surface 30 for enabling the connection of the cleat element with the rubber belts. A series of spaced-apart rubber projections or pads 36 are integrally mounted on side surface 32 and disposed at spaced-apart locations along the length of surface 32; they serve the purpose of increasing the vehicle resistance to side slipping on hills. Additional skidding resistance is obtained in providing the top surface 37 of projections 36 (which surface is parallel to surface 32) with a series of oblique parallel grooves 38. When it is desired to operate over hard, slipping surfaces, ice calks can be added to the cleat elements such as by bolting calk assemblies (not shown) to sidewall 24. Furthermore, excessive wear of pads 36 can be prevented by making their upper edges even with that of sidewall 24.

The oblique side surface 32 is the working surface of the cleat element; it faces the direction of travel of the rubber belts such that when the cleat element digs into the snow, it propels the vehicle with this surface. Because of the triangular shape of the cleat element, it is now possible to have a large working surface and a small snow-indenting surface.

FIGS. 5, 6, 7, 8 and 9 illustrate a preferred embodiment of the invention. The cleat element 40 shown consists of an angle iron 42, having a sidewall 44 and a bottom wall 46, and of a rubber filling 48 contained within these walls. A series of spaced-apart holes 50 and 52 extend lengthwise of the cleat structure for securing the same to the rubber belts of the vehicle. A series of pads 54, integral with the rubber filling, protrude over the oblique surface 56 of filling 48; satisfactory results have been obtained in having one pad at each end of the cleat structure and one at the middle, the end pads having oblique parallel grooves 58 provided thereon and the middle pad having straight parallel grooves 60. The lower edge 62 at the middle portion of the cleat element may be curved upwardly as shown in FIGS. 5 and 8 for smoother running over the teeth of sprockets 23.

The sidewall 44 of this preferred cleat is characterized in having a tapering configuration extending from the middle portion thereof towards the opposite ends: the taper corresponds to the distribution of forces acting on the cleat structure in ground-engaging operation. Since the width of bottom wall 46 remains generally constant throughout the length of cleat element 40, the gradually decreasing height of sidewall 44 causes the angle of the outer surface of filling 48 to increase from the center to the extremities of cleat element 40. In a typical construction this angle varies from 45° to 60°.

Furthermore, in the illustrated construction, the upper edges 64 and 66 of pads 54 and filling 48, respectively, do not extend beyond a horizontal plane A that includes the upper edge 68 of the sidewall 44, throughout the entire length thereof. Similarly, the bottom edges of the pads and the rubber filling, throughout the entire length of the cleat element, do not extend beyond a vertical plane B that includes the extremity 70 of bottom wall 46. In this preferred construction, the edges of the pads and rubber are not damaged through excessive wear. Ice calks can also be added to cleat element 40 by bolting or otherwise securing calk assemblies to sidewall 44.

Cleat element 40 can be made from rectangular blank of relatively hard steel folded along its length through an angle of 90°, and the taper configuration is effected by cutting the corners on the same side of the blank. This results in a substantial weight reduction but requires an additional operation. Rubber is then molded in accordance with well-known rubber forming and bonding techniques.

Although the invention has been described above in relation to two specific forms of the invention, it will be evident to those skilled in the art, that it may be refined and modified in various ways without departing from its scope. It is therefore wished to have it understood that this invention is not limited in interpretation except by the terms of the following claims.

We claim:

1. A cleat element for fixing to an endless track of the type used on track propelled vehicles comprising
    an elongated rigid angular member formed of a sidewall and a bottom wall, said walls defining contiguous inner and outer surfaces; and
    a rubberlike resilient material contained within the contiguous inner surfaces of said side and bottom walls through the entire length thereof, said material being bonded to said inner surfaces and defining a side surface contiguous with said outer surfaces, and said side surface being angled relative to said walls to thereby form a cleat element of triangular cross section.

2. A cleat element as defined in claim 1 wherein said angular member is an angle iron and said side surface forms an oblique angle between about 45° and 60° relative to said outer surfaces; said bottom wall having means for permitting said cleat element to be fixed to said track.

3. A cleat element as defined in claim 2 wherein said side surface is provided with a plurality of integrally mounted projections disposed at spaced-apart locations along the length of said side surface.

4. A cleat element as defined in claim 3 wherein each of said projections has a top surface parallel to said side surface, said top surface of said projections having a series of parallel grooves extending thereon.

5. A cleat element as defined in claim 1 wherein said sidewall tapers from the middle portion thereof towards the opposite free ends thereof at a relatively narrower width.

6. A cleat element as defined in claim 5 wherein said member is an angle iron and wherein said bottom wall is provided with means for permitting said cleat element to be fixed to said track.

7. A cleat element as defined in claim 6 wherein said side surface is provided with a plurality of integrally mounted projections disposed at spaced-apart locations along the length of said side surface, each of said projections having a top surface provided with a series of parallel grooves.

8. A cleat element as defined in claim 7 wherein a first projection is located at the middle portion of said side surface and second and third projections are respectively located at the opposite end portions thereof, the grooves of said second and third projections being at an angle relative to grooves of said first projections; the lower edge of said bottom wall at said middle portion of said side surface being slightly upwardly curved.

9. In a track propelled vehicle including at least one pair of endless tracks of corresponding dimensions and disposed in a parallel relationship to each other, a series of cleat elements cross-linking said pair of tracks in a symmetrical arrangement with respect to driving elements driving the same, each of said cleat elements comprising an elongated rigid angle iron extending transversely of said tracks and formed of a sidewall and a bottom wall, said walls defining contiguous inner and outer surfaces, said bottom wall being secured to the outer surface of said tracks; and a rubberlike resilient material contained within the contiguous inner surfaces of said side and bottom walls, through the entire length thereof, said material being bonded to said inner surfaces and defining a side surface contiguous with said outer surfaces and being angled thereto to thereby form a cleat element of triangular cross section, said side surface facing the direction of travel of said tracks to thereby become the working surface of said cleat element when the lower run of said tracks is in ground-engaging operation.

10. In a track propelled vehicle as defined in claim 9 wherein said sidewall of each angle iron tapers from its middle portion toward the opposite end portions thereof at a relatively narrower width corresponding to the load distribution exerted by the ground on the working surface of said cleat element.

11. In a track propelled vehicle as defined in claim 10 wherein a first rubberlike projection is integrally mounted to said side surface and disposed at the middle portion of said side surface, and second and third rubberlike projections are integrally mounted to said side surface and disposed respectively at each opposite end portion of said side surface, said projections having a series of parallel grooves extending on the top surface thereof.

12. In a track propelled vehicle as defined in claim 11 wherein the lower edge of said bottom wall located at said middle portion and extending over the driving elements of said tracks is upwardly slightly curved.

13. In a track propelled vehicle as defined in claim 11 wherein the upper edge of said side surface extends in a horizontal plane including the edge of said sidewall throughout the entire length of said cleat element, and the lower edge of said side surface extends in a vertical plane including the extremity of said bottom wall throughout the entire length of said cleat element.

14. In a track propelled vehicle as defined in claim 13 wherein said horizontal plane includes the upper edge of said projections, and wherein the vertical plane includes the lower edge of said projections.

15. A cleat element for cross-linking two side-by-side flexible endless belts slightly spaced apart from one another to thereby define an endless track suitable for use in conjunction with the wheels of track propelled vehicles, comprising:

an elongated angular member made of metal adapted to extend transversely of and span the space between said endless belts, and defining a bottom wall adapted to rest against the inside surface of said endless belts and support said wheels, and a load bearing sidewall upstanding from said bottom wall, and a rubberlike filling bonded onto the inside surfaces of said angular member and defining the ground engaging surface of said cleat element, said ground engaging surface being angled relative to said bottom wall.

* * * * *